United States Patent
Toba et al.

(10) Patent No.: US 10,438,383 B2
(45) Date of Patent: Oct. 8, 2019

(54) DISPLAY DEVICE

(71) Applicant: HITACHI, LTD., Chiyoda ku, Tokyo (JP)

(72) Inventors: Tadanobu Toba, Tokyo (JP); Takumi Uezono, Tokyo (JP); Yusuke Kanno, Tokyo (JP); Masahiro Shiraishi, Tokyo (JP); Hideo Harada, Tokyo (JP); Satoru Akasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 28 days.

(21) Appl. No.: 15/370,630

(22) Filed: Dec. 6, 2016

(65) Prior Publication Data
US 2017/0249760 A1 Aug. 31, 2017

(30) Foreign Application Priority Data

Feb. 29, 2016 (JP) .................... 2016-037046

(51) Int. Cl.
*G06T 15/00* (2011.01)
*G06T 11/20* (2006.01)
(Continued)

(52) U.S. Cl.
CPC .............. *G06T 11/20* (2013.01); *G05B 23/02* (2013.01); *G06F 3/14* (2013.01); *G09G 2330/08* (2013.01);
(Continued)

(58) Field of Classification Search
CPC .......... G06T 11/20; G06F 3/14; G05B 23/02; G09G 2330/08; G09G 2330/12; G09G 2340/12
(Continued)

(56) References Cited

U.S. PATENT DOCUMENTS 5,993,055 A * 11/1999 Williams .............. G06F 11/184
714/732
6,279,119 B1 * 8/2001 Bissett ................ G06F 11/1633
703/23
(Continued)

FOREIGN PATENT DOCUMENTS

| EP | 1762825 A2 | 3/2007 |
|----|-----------|--------|
| JP | 2000-172482 A | 6/2000 |
| JP | 2010-3092 A | 1/2010 |

OTHER PUBLICATIONS

Kosowski, Thorin, The Difference Between Your Mac's Various Wait Cursors, LifeHacker, pp. 1-3, Oct. 2, 2015.*
(Continued)

*Primary Examiner* — Phu K Nguyen
(74) *Attorney, Agent, or Firm* — Miles & Stockbridge, P.C.

(57) ABSTRACT

The present invention includes a drawing data generating unit, a variation pattern that varies at regular intervals to be displayed, a display unit that displays drawing data, and a comparator that compares whether input signals are coincident, and the drawing data generating unit includes a receiver that receives data from a higher-level device, a drawing control unit that converts the data received from the higher-level device to drawing data, and a drawing memory that stores the drawing data. The drawing data generating unit and the variation pattern are redundantly configured, and the variation pattern is input to the drawing data generating unit. One output signal of the drawing data generating unit regarding drawing data including the variation pattern is transmitted to the display unit, a plurality of output signals from the drawing data generating unit are input to the comparator, and the comparator outputs a comparison result as a detection signal outside. This improves safety and reliability when severe safety criteria (Continued)

are required such as in a case of monitor-display in industrial plant equipment.

12 Claims, 12 Drawing Sheets

(51) Int. Cl.
 G06F 3/14 (2006.01)
 G05B 23/02 (2006.01)
(52) U.S. Cl.
 CPC ..... G09G 2330/12 (2013.01); G09G 2340/12 (2013.01)

(58) Field of Classification Search
 USPC .......................................................... 345/418
 See application file for complete search history.

(56) References Cited

U.S. PATENT DOCUMENTS

| | | | | |
|---|---|---|---|---|
| 6,327,668 | B1 * | 12/2001 | Williams | G06F 9/52 |
| | | | | 712/9 |
| 7,539,897 | B2 * | 5/2009 | Mizutani | G06F 11/1645 |
| | | | | 714/11 |
| 8,140,893 | B2 * | 3/2012 | Niino | G06F 11/1679 |
| | | | | 714/11 |
| 8,935,569 | B2 * | 1/2015 | Kabulepa | G06F 11/1641 |
| | | | | 714/11 |
| 9,477,559 | B2 * | 10/2016 | Shirano | G06F 11/1641 |
| 2007/0260799 | A1 | 11/2007 | Machida | |
| 2013/0024721 | A1 | 1/2013 | Kabulepa et al. | |

OTHER PUBLICATIONS

Extended European Search Report dated Jun. 28, 2017 for related European Application No. 16002552.4.

* cited by examiner

FIG. 2B
VARIATION DRAWING EXAMPLE 1

FIG. 2C
VARIATION DRAWING EXAMPLE 2

DISPLAY DEVICE

BACKGROUND OF THE INVENTION

The present invention relates to a display device, and especially relates to a display device preferable for using for improved safety and reliability in a case of monitor-display in industrial plant equipment.

Conventionally, in large-sized industrial plant equipment, an observer has monitored an operation condition of the plant on a display device in a monitoring room to deal with, for example, variation and accidents. In particular, for example, in an atomic power plant, high safety is required, thus monitoring the plant has important responsibility.

A technique that enhances safety in a screen display system of an electric power company is disclosed in Japanese Patent Application Laid-Open No. 2010-3092. The screen display system in Japanese Patent Application Laid-Open No. 2010-3092 is "a screen display system that displays a management screen on a display unit of an operations management calculator, including priority order data that specifies a priority order of execution tasks for a plurality of tasks including a task that generates the management screen to display, and including execution task determining means that determine an execution task based on the priority order data, and change image display means that change an image displayed on a part of the display unit to a different image, wherein a task that the change image display means changes an image displayed on a part of the display unit to a different image is lower than a task that generates the management screen to display, in the priority order in the priority order data" (Claim 1). Furthermore, a technique that attempts to enhance reliability of a display device by redundancy is disclosed in Japanese Patent Application Laid-Open No. 2000-172482. A high reliable display device in Japanese Patent Application Laid-Open No. 2000-172482 is "a high reliable display device by multiplex computer systems including at least two computer systems that control an image signal, switch means that switch each of the computer systems, and display means that display an image based on the image signal transmitted from the computer system switched by the switch means, wherein each of the computer systems includes display storing means that store the image signal transmitted to the display means, and the switch means read the image signal stored by the display storing means to cause the display means to display the image, and when the computer system that transmits the image signal is broken, until a taking-over process of the image signal to another switchable computer system is completed and the switch means switch the other computer system to the display means, update of memory content by the display storing means that belongs to the broken computer system is forcibly stopped, and the switch means causes the display means to display a screen based on the image signal before the breakdown of the broken computer system" (Claim 1).

In the above-described technique disclosed in Japanese Patent Application Laid-Open No. 2010-3092, an observer visually determines large change of display, such as disturbance of screen and disappearance of display, when there is a trouble on a display device that a control/monitor system of conventional large-sized plant control system or large-sized electric generating facility employs. However, there is a problem that when diagram shapes, colors, and characters of a part of a state display such as video information are changed to incorrect diagrams and characters by breakdown that has occurred in software and a drawing circuit that display drawing data on a display panel such as a liquid crystal display in the display device, it is difficult for the observer to quickly recognize its correctness/incorrectness. There has been a problem that in the system that displays a control/monitor system state on, for example, the display device that the above-described large-sized system employs to monitor and control, the display on the screen hardly changes in many cases unless special events such as an ON/OFF operation, an abnormal detection, and an abnormal stop of the system occur, thus it is difficult for the observer to quickly determine even when the display device is broken to freeze.

For example, nuclear power plants have a considerably severe safety level (electron system is equivalent to SIL3 to SIL4 of IEC61508 standard) in many cases, and especially for a device that displays control/monitor state of a protective system, such as forcible water injection and vent in case of an abnormal occurrence in a monitoring display device of a nuclear reactor and a control system, compliance to the severest safety criteria may be required.

The above-described technique disclosed in Japanese Patent Application Laid-Open No. 2010-3092 employs, as a method that detects a freeze state of display system, a method that disposes a process task that changes the image on a process of a control processor, and then lowers an execution priority order of this process task than that of a display process task of an ordinary operation to detect the freeze state without trouble in an ordinary display. In this display method in Japanese Patent Application Laid-Open No. 2010-3092, it is not possible to detect display failure such that only a part of display is superficially misread as a normal display by malfunction of the process task. It is also difficult for the observer to detect a mistake only by looking the display device.

The above-described display device in Japanese Patent Application Laid-Open No. 2000-172482 duplicates the display system to cause one of the display systems to wait, and then switches in case of trouble of the display system to improve availability. In this display device in Japanese Patent Application Laid-Open No. 2000-172482, especially for monitor display of the plant, it is not possible to detect a mistake in drawing data, and it is also not possible to detect malfunction of the process task.

The present invention is made to address the above-described problems. The purpose of the present invention is to provide a display device that improves safety and reliability, when severe safety criteria are required such as in a case of monitor-display in industrial plant equipment.

SUMMARY OF THE INVENTION

A configuration of a display device of the present invention is a display device that receives data from a higher-level device to display. The display device include: a drawing data generating unit, a variation pattern that varies at regular intervals to be displayed, a display unit that displays drawing data, and a first comparator that compares whether input signals are coincident. The drawing data generating unit includes: a receiver that receives data from the higher-level device, a drawing control unit that converts the data received from the higher-level device into drawing data, and a drawing memory that stores the drawing data. The drawing data generating unit and the variation pattern are redundantly configured, the variation pattern is input to the drawing data generating unit, one output signal of the drawing data generating unit regarding drawing data including the variation pattern is transmitted to the display unit, a plurality of output signals from the drawing data generating unit are input to the first comparator, and the first comparator outputs a comparison result as a detection signal outside.

The present invention is made to achieve the above-described object.

DESCRIPTION OF THE PREFERRED EMBODIMENT

The following describes each embodiment according to the present invention with reference to the drawings.

First Embodiment

Figure 1:
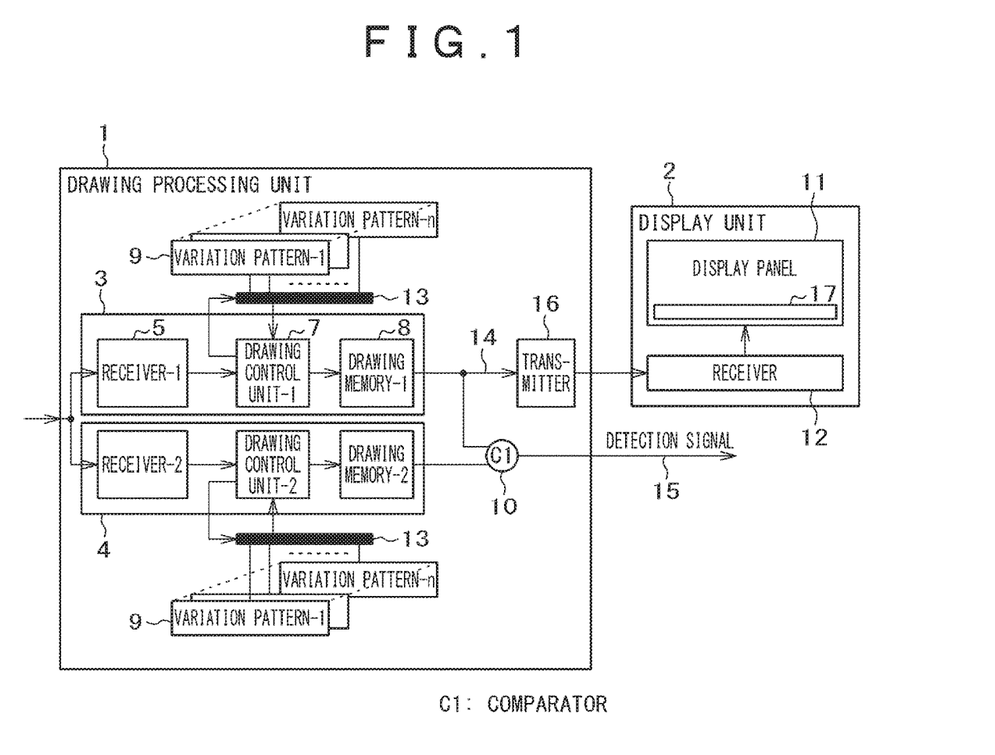
FIG. 1 is a block diagram of a display device according to a first embodiment.
Figure 2A:
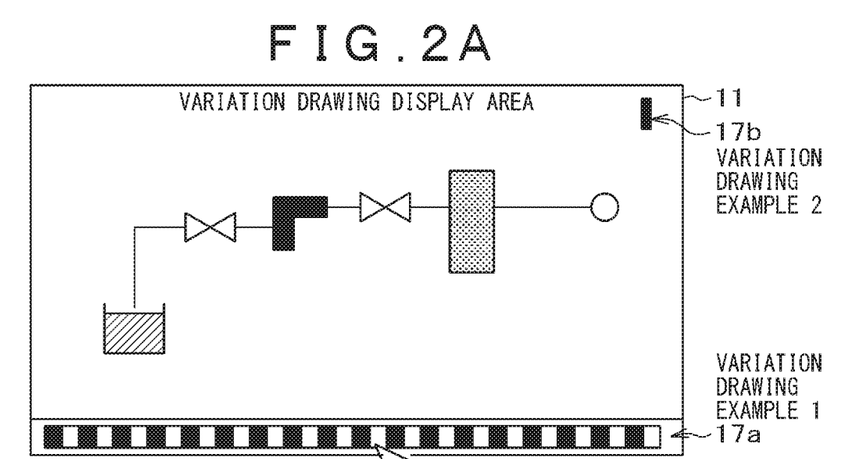
FIGS. 2A to 2C are diagrams that illustrate display examples of the display device according to the first embodiment.
Figure 2B:
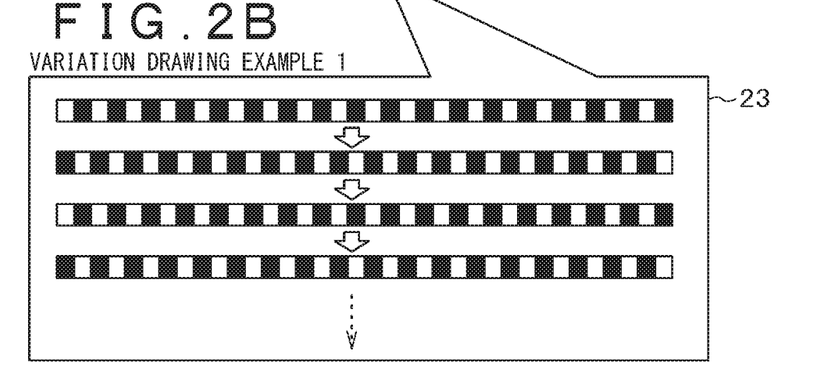
Figure 2C:
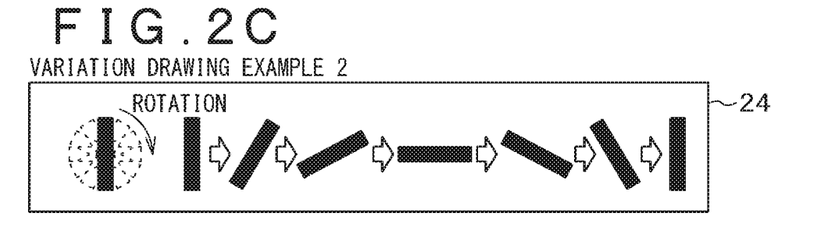

The following describes a display device according to a first embodiment with reference to FIGS. 1 to 2C.

FIG. 1 is a block diagram of the display device according to a first embodiment.

FIGS. 2A to 2C are diagrams that illustrate display examples of the display device according to the first embodiment.

The display device of this embodiment includes a drawing processing unit 1 that creates drawing data for display and a display unit 2 that receives the drawing data to display.

The drawing processing unit 1 includes a drawing data generating unit 3, variation patterns 9, a selector 13, a comparator 10, and a transmitter 16. The drawing data generating unit 3 includes a receiver 5, a drawing control unit 7, and a drawing memory 8.

The receiver 5 receives information such as diagrams and characters to be displayed from, for example, a control unit, a computer, and an information processing device. The drawing control unit 7 generates data for drawing, for example, bit-map data from the information input at the receiver 5. The drawing memory 8, which is a semiconductor memory, temporarily holds the data for drawing. The variation patterns 9 are pattern data of the drawing data displayed for diagnosis separately from an ordinary display. The pattern selector 13 is a part that selects a variation pattern from the stored plurality of variation patterns 9 by an output signal of the drawing control unit 7.

Furthermore, a redundant configuration including a plurality of these drawing data generating units 3, variation patterns 9, and pattern selectors 13 is made, and then data of the drawing memory 8 in one system of this redundant configuration is read in synchronization with a display timing of the display unit 2 (14).

The comparator 10 is a device that compares whether each piece of data read from the plurality of drawing memories 8 is coincident. The result in the comparator 10 is output as a detection signal 15. Handling of the detection signal 15 will be described in the later embodiment. The transmitter 16 is a part that transmits one piece of the data read from the drawing memory 8 to the display unit 2.

The display unit 2 includes a drawing data receiver 12 and a display panel 11.

The drawing data receiver 12 is a part that receives the drawing data from the drawing processing unit 1. The display panel 11 is a luminescent panel consists of, for example, a liquid crystal display (LCD).

The display unit of this embodiment includes an area 17 that constantly displays the drawing data of the variation pattern 9 at a part of a display area of the display panel 11. The area 17 is not limited to be at a special position, and may be placed anywhere at the display panel 11.

The display device of this embodiment converts the information for display that the receiver 5 has received, to the data for drawing at the drawing control unit 7, and then transmits the data for drawing to the display unit 2 via the drawing memory 8 to display according to an instruction. In this regard, the drawing control unit 7 retrieves the variation pattern 9 at a predetermined timing, and then interrupts a part of the data for drawing to insert the variation pattern 9. For the redundantly configured parts, identical operations are performed, and the selection of the variation pattern 9 is also identical.

Accordingly, in a case of a normal operation, the detection signal 15 of the comparator 10 indicates coincidence. When the detection signal 15 does not indicate coincidence, it means that there is an abnormality in the drawing processing unit 1.

A display example on the display unit 2 is illustrated in FIGS. 2A to 2C. As illustrated in FIG. 2A, ordinary operation information of, for example, a target control system is displayed at a center of the display panel 11, and below the ordinary operation information, a target that varies a display state is constantly displayed at an area 17a. As illustrated in FIG. 2B, a display example 23 changes white and black patterns back and forth as time goes on. As illustrated in FIG. 2C, a display example 24 illustrates an example displayed such that a vertical bar constantly rotates, such that the variation patterns that varies an angle of the vertical bar as time goes on are sequentially selected to be displayed at an area 17b. It is not necessary to limit, for example, varying drawings and characters in the display device of this embodiment. Insofar as drawings and characters that can constantly change those parts for display according to the variation pattern, those shapes and colors are not limited.

As described above, the display device of this embodiment can make the control unit, which generates the data for drawing, a redundant configuration and sequentially performs coincidence detection of its output to quickly detect that incorrect data is generated due to, for example, a breakdown. Inserting the variation pattern that consistently varies a drawing state into an ordinary drawing process ensures an observer to visually perceive freeze states of the drawing process and the display unit to promptly discover trouble in the display device. This ensures safety system operation such that the observer does not receive incorrect determination and incorrect instruction.

In this embodiment, a variation display for diagnosis is not single process means. This embodiment has a configuration where control of ordinary drawing and control of drawing for diagnosis are independent one another, thus ensuring repeated executions of the variation display without inhibiting the ordinary drawing control processing. This can promptly detect the trouble in the display device to prevent incorrect determination induction and operational errors of the observer by incorrect display, thus ensuring improvement of safety and operation efficiency of the system.

Second Embodiment

Figure 3:
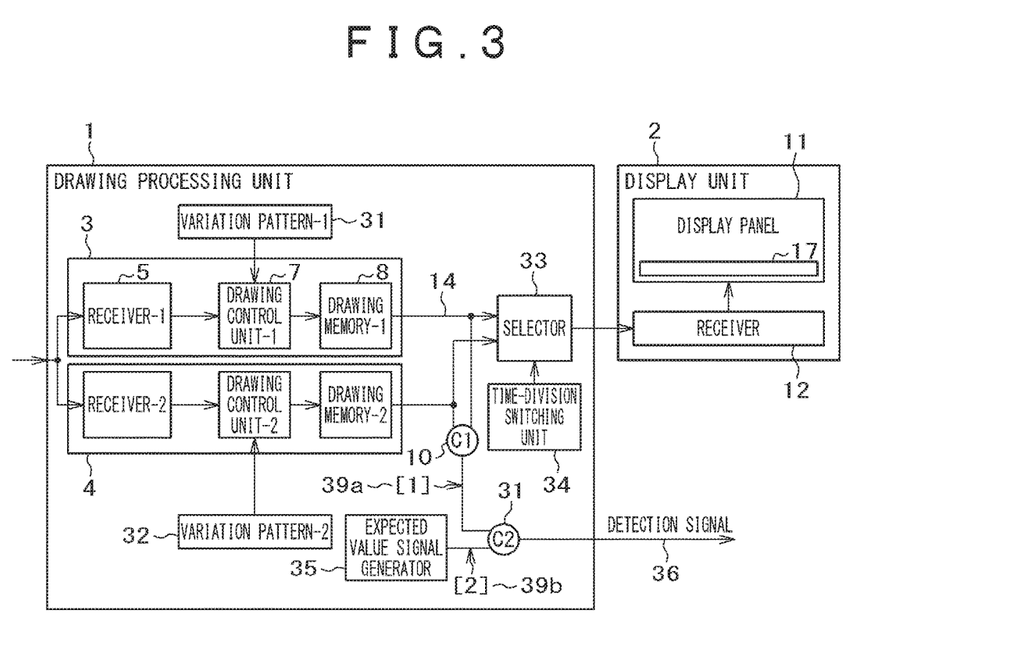
FIG. 3 is a block diagram of the display device according to a second embodiment.
Figure 4A:
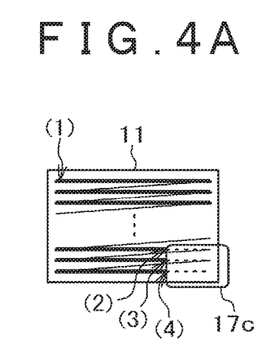
FIGS. 4A and 4B are diagrams that illustrate a display example in a display unit and a relation between signals in a drawing processing unit.
Figure 4B:
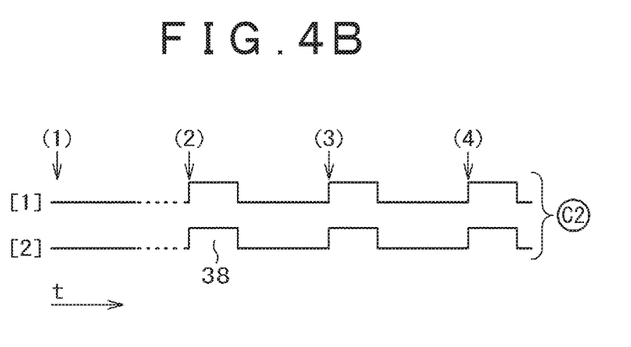

The following describes a display device according to a second embodiment with reference to FIGS. 3 to 4B.

FIG. 3 is a block diagram of the display device according to the second embodiment.

FIGS. 4A and 4B are diagrams that illustrate a display example in a display unit and a relation between signals in a drawing processing unit.

In this embodiment, parts different from those in the first embodiment will be mainly described.

The display device of this embodiment includes pieces of variation pattern data (31 and 32) different one another with respect to the respective drawing data generating units of the redundant configuration. Furthermore, the display device of this embodiment includes a transmission data selector 33, a time-division switching unit 34, and an expected value comparator 31.

The transmission data selector 33 selects which output data 14 of the drawing memory 8 of the redundant configuration to be transmitted to the display unit 2. The time-division switching unit 34 controls time-divisional switches of selection of the transmission data selector 33. The expected value comparator 31, which is a device that compares whether an output of the comparator 10 and an output of an expected value signal generator 35 are consistent, outputs a result of the comparison as a detection signal 36. The comparator 10 compares whether the pieces of data read from the plurality of drawing memories 8 are consistent. The expected value signal generator 35 generates a signal change identical to the output signal of the output of the comparator 10.

In this embodiment, as illustrated in FIG. 4A, the display example on the display panel 11 is illustrated in, what is called, a scanning line image, which moves from un upper left part to a right side, and then from a right edge to the next line on the display panel 11. At a lower right part on the display panel 11, an area 17c that displays the variation pattern illustrated on the display unit 2 is taken. In the display example of this embodiment, the variation pattern 31 and the variation pattern 32 are used as the drawing data in the area 17c.

The variation patterns 31 and 32, which are opposing drawing data (for example, complement data) one another, are constantly inconsistent when comparing the variation patterns in the comparator 10.

A signal waveform of a signal [1]39a from the comparator 10 is illustrated in FIG. 4B.

The signal waveform of the signal [1]39a is compared from un upper left end part (1) of the display example, and then sends the data of the variation patterns 31 and 32 when entering to the area 17c.

The comparator 10 detects inconsistency of the data in comparison in the area 17c to output a High level, which indicates inconsistency, in this example ((2)). Then, during sending ordinary drawing data, the comparator 10 transitions in a consistent state if there is no abnormalities in the drawing processing unit 1, and then outputs again the High level when entering to the area 17c ((3)). Afterward, (4) is also similar.

In contrast, the expected value signal generator 35 generates a signal identical this signal waveform to input this signal [2]39b to the comparator 31. Then, the coincidence detection of the signal 39a and the signal 39b is performed, thus ensuring the detection of inconsistency when breakdowns or the like occur in the drawing data generating unit 3 or the comparator 10. A configuration that includes a plurality of variation patterns as in the example illustrated in FIG. 1 of the first embodiment and selects based on a signal from the drawing control unit 7 may be possible.

As described above, this embodiment can make the control unit, which generates the data for drawing, a redundant configuration and sequentially performs coincidence detection of its output to quickly detect that incorrect data is generated due to, for example, a breakdown. And inserting the variation pattern that consistently varies a drawing state into an ordinary drawing process ensures an observer to visually perceive freeze states of the drawing process and the display unit to promptly discover trouble in the display device. Furthermore, passing the outputs of all the processing systems of the redundant configuration to the display unit 2 to display ensures not only checks in the comparator 10 and the comparator 31, but also visual recognition of abnormalities by the observer to establish a high safety display device.

Third Embodiment

Figure 5:
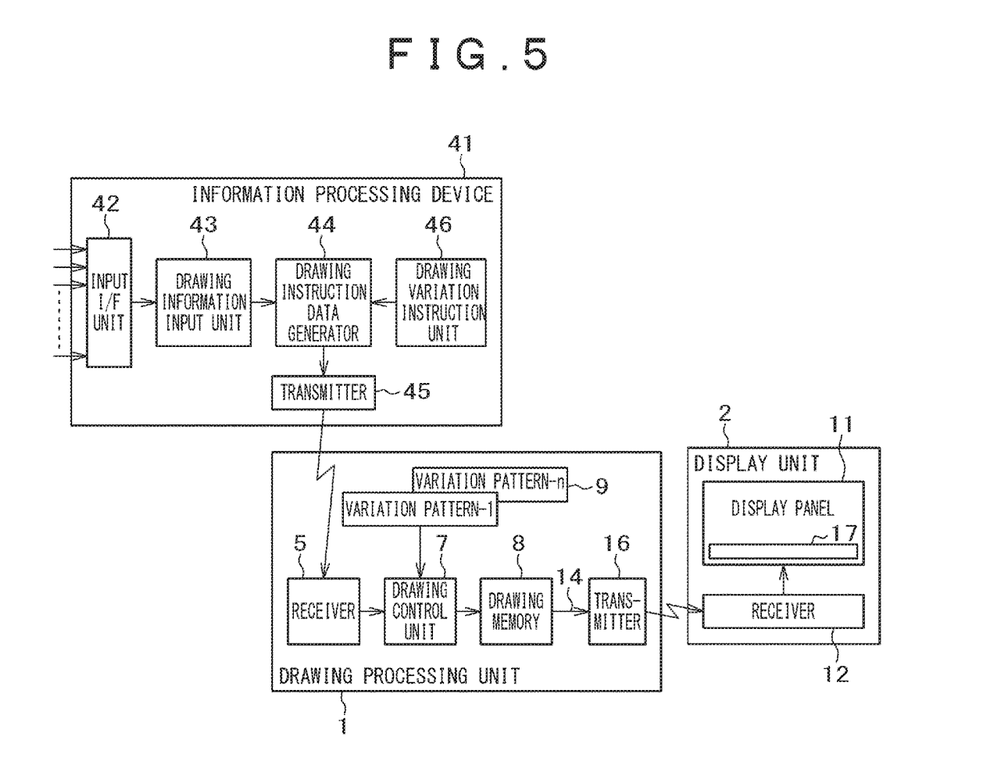
FIG. 5 is a block diagram of a display device according to a third embodiment.
Figure 6:
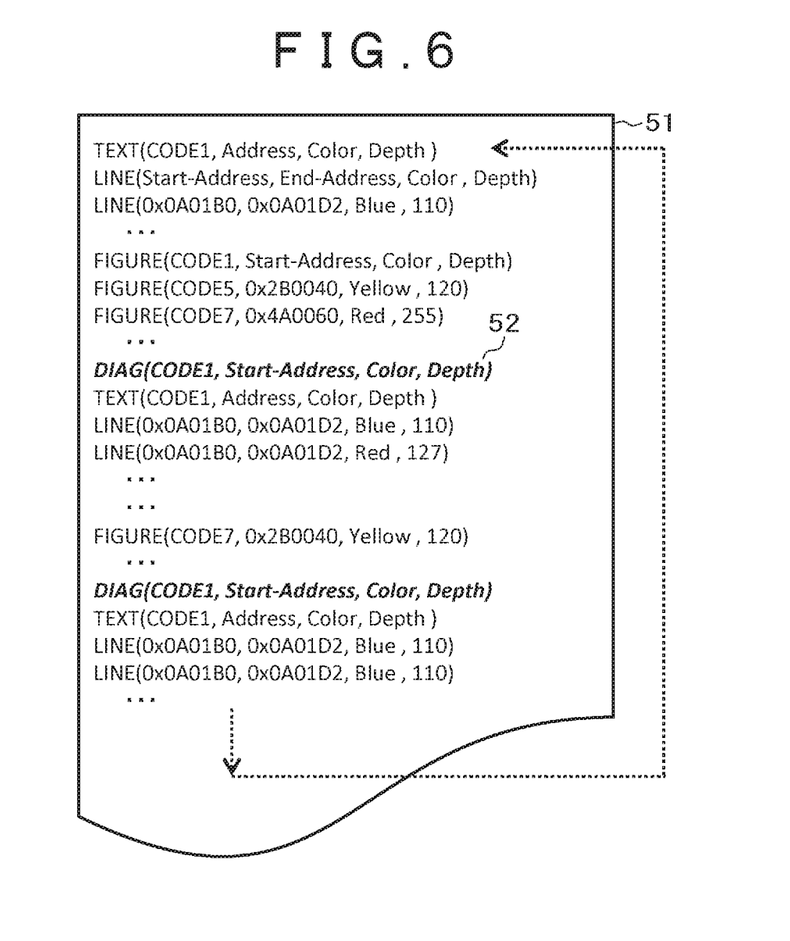
FIG. 6 is a diagram that illustrates exemplary order rows of drawing instruction control.

The following describes a display device according to a third embodiment with reference to FIG. 5 and FIG. 6.

FIG. 5 is a block diagram of the display device according to the third embodiment.

FIG. 6 is a diagram that illustrates exemplary order rows of drawing instruction control.

Also in this embodiment, parts different from those in the first embodiment will be mainly described.

This embodiment includes an information processing device 41 that creates information such as diagrams and characters to be displayed, and this embodiment converts it into drawing data to be sent to the display unit 2 at the drawing processing unit 1 based on this information from the information processing device 41.

The information processing device 41 includes an input interface (I/F) unit 42, a drawing information input unit 43, a drawing instruction data generator 44, and a drawing variation instruction unit 46.

The input I/F unit 42 receives information from, for example, other information processing device, plant control system, and computer. The drawing information input unit 43 determines diagrams and characters to be displayed on the display device based on the received information. The drawing instruction data generator 44 converts it into a drawing instruction order based on a result determined in the drawing information input unit 43. The drawing variation instruction unit 46 inserts a selection instruction order of variation pattern data in order to constantly vary the display state.

The drawing instruction order that the drawing instruction data generator 44 generates is illustrated in FIG. 6. In this example, a character output instruction is performed by a TEXT instruction, and a character type (CODE1), a display position (Address), a color (Color), and a tone (Depth) are added as its attribution data. A line drawing instruction is performed by a LINE instruction, and similarly, a position and a color are added as attribution data. Inserting orders that selects and displays the variation pattern at a timing predetermined by the drawing variation instruction unit 46 here ensures a display that constantly varies. In the example illustrated in FIG. 6, this is performed by a DIAG instruction, and similarly, a diagram type, a display position, a color, and the like are added as attribution data. However, this DIAG instruction is one example, and if there is information required in accordance with functions of the display unit 2, attribution information or drawing instruction orders, which are not illustrated in FIG. 6, can be added.

As described above, this embodiment ensures simplification of the configuration of the drawing processing unit 1 to reduce cost and power consumption, in addition to the effects similar to those of the first embodiment and the second embodiment. It is also possible that a processor is used for the drawing processing unit 1 and each component is realized as a process program.

Fourth Embodiment

Figure 7:
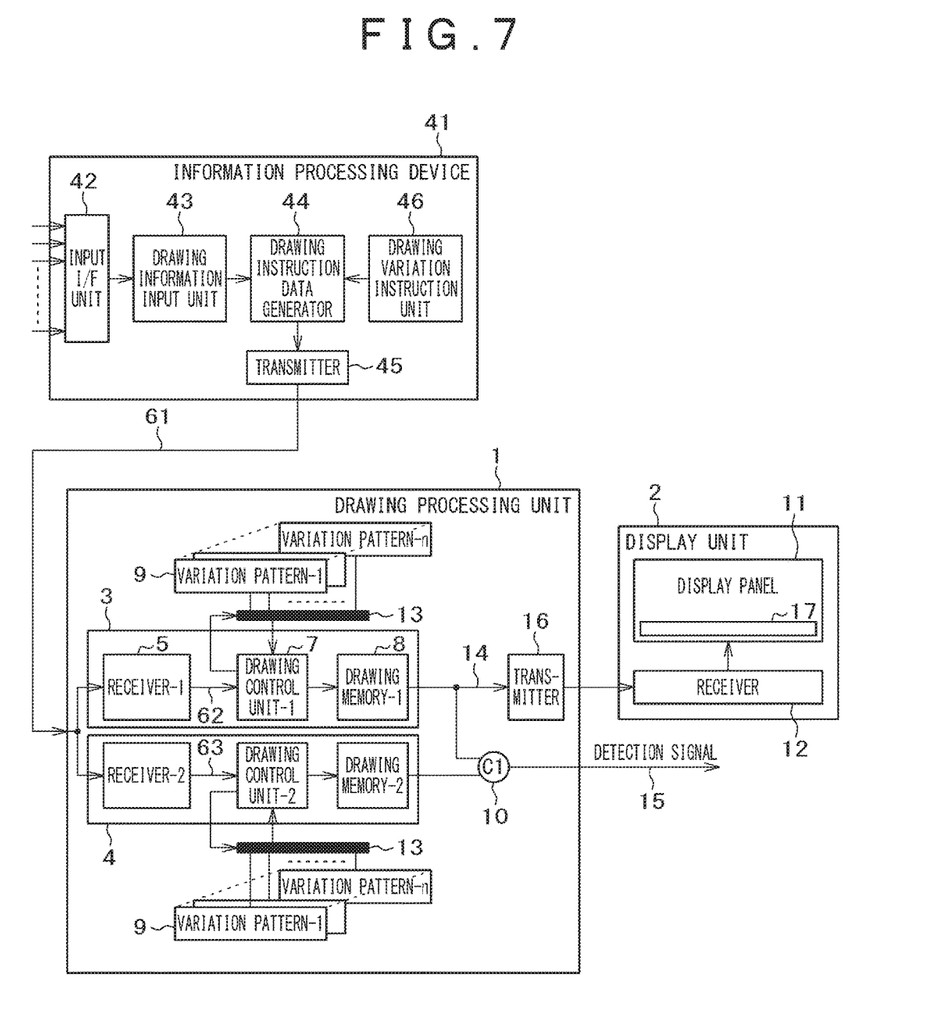
FIG. 7 is a block diagram of a display device according to a fourth embodiment.

The following describes a display device according to a fourth embodiment with reference to FIG. 7.

FIG. 7 is a block diagram of the display device according to the fourth embodiment.

This embodiment has a configuration that combines the drawing processing unit illustrated in FIGS. 4A and 4B of the third embodiment and the drawing processing unit illustrated in FIG. 1 of the first embodiment.

This embodiment interprets the order at the drawing control unit 7 inside the drawing processing unit 1 that has receives the drawing instruction order from the information processing device 41, and then selects the variation pattern according to its instruction to output to the drawing memory 8.

As described above, this embodiment ensures detection of the breakdown in the drawing processing unit 1 by the redundant configuration, in addition to the effects similar to those of the third embodiment.

Fifth Embodiment

Figure 8:
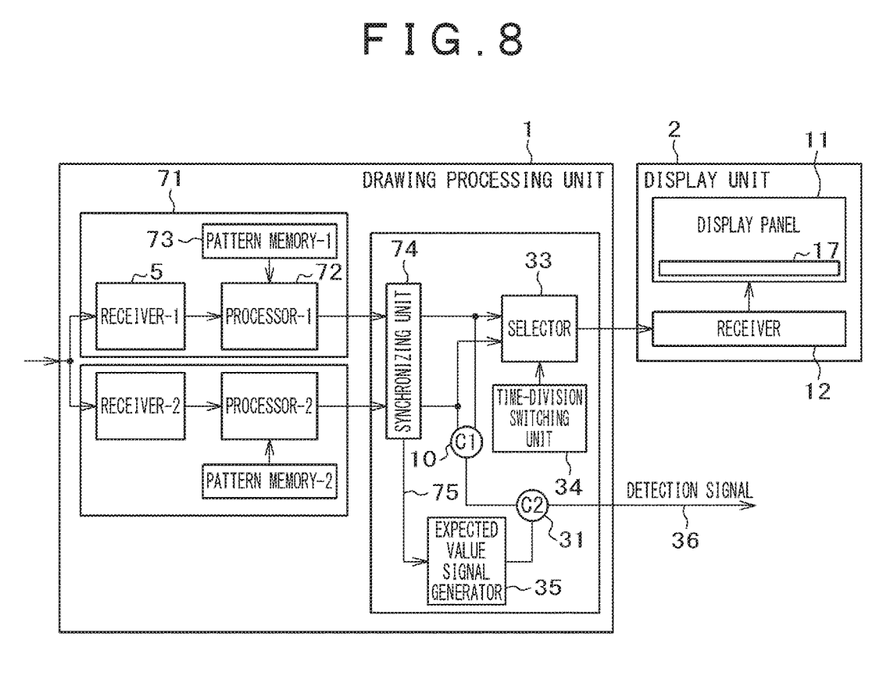
FIG. 8 is a block diagram of a display device according to a fifth embodiment.

The following describes a display device according to a fifth embodiment with reference to FIG. 8.

FIG. 8 is a block diagram of the display device according to the fifth embodiment.

Also in this embodiment, parts different from those in the first embodiment will be mainly described.

In this embodiment, a function that generates data for drawing, such as the drawing control unit and the drawing memory inside the drawing processing unit 1 is configured by a processor 72. For example, the processor 72 converts from the drawing instruction order to bit-map data, then calculates bit position information from a drawing target position and a drawing direction attribution written in the drawing instruction order, then temporarily stores bit-map information, which is a result of this calculation, in a memory inside the processor, and then synchronizes the bit-map information at a display timing of the display unit 2 to send from the memory through a general-purpose bus output. This embodiment has a redundant configuration similar to the second embodiment in order to detect the breakdown in the drawing processing unit 1. Then, this embodiment has a configuration that time-divisionally switches these redundant-configured outputs to output. In this regard, since the outputs of the redundant processors 72 have no guarantee that a priority order of process tasks are output at a completely identical timing by, for example, an operating system (OS), the outputs from the respective processors are held in a synchronizing unit 74, which is a temporal buffer, to synchronize the outputs from all the processors. Differences of the outputs of the processors are adjusted to be less than or equal to a display output cycle of the display unit 2, in the processors.

As described above, this embodiment ensures implementation using a general-purpose processor to decrease development cost and period, in addition to the effects similar to those of the second embodiment.

Sixth Embodiment

Figure 9:
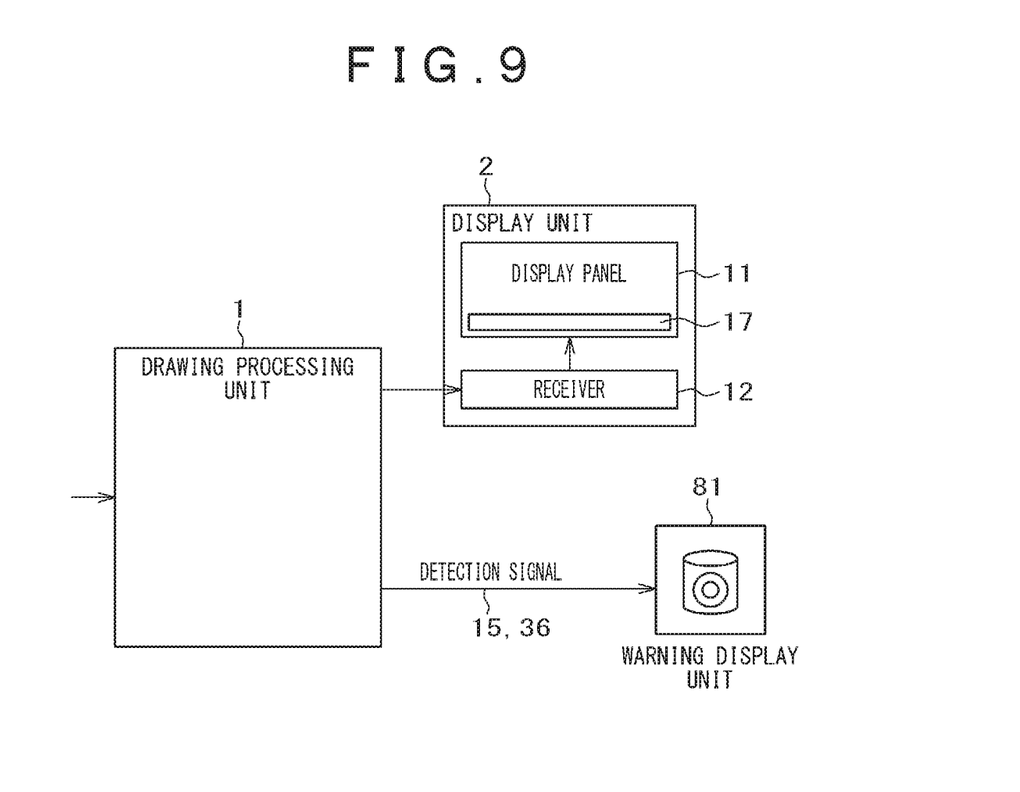
FIG. 9 is a block diagram of a display device according to a sixth embodiment.

The following describes a sixth embodiment with reference to FIG. 9.

FIG. 9 is a block diagram of a display device of the sixth embodiment.

In this embodiment, parts different from those in the first embodiment and the second embodiment will be mainly described.

This embodiment includes a warning display unit 81 in addition to the configuration of the display device illustrated in the above-described first embodiment to fifth embodiment.

The failure detection signal 15 or the detection signal 36 output from the drawing processing unit 1 is input to the warning display unit 81. The warning display unit 81 displays being an abnormal state after receiving this detection signal. A warning display is active for the observer, that is, performs what is called an active warning, such as light emission, sound, and display at another warning display device.

As described above, this embodiment eliminates the need that the observer carefully visually perceives that an abnormality occurs to ensure a quick and clear state display, in addition to the effects of the above-described first embodiment to fifth embodiment.

Seventh Embodiment

Figure 10:
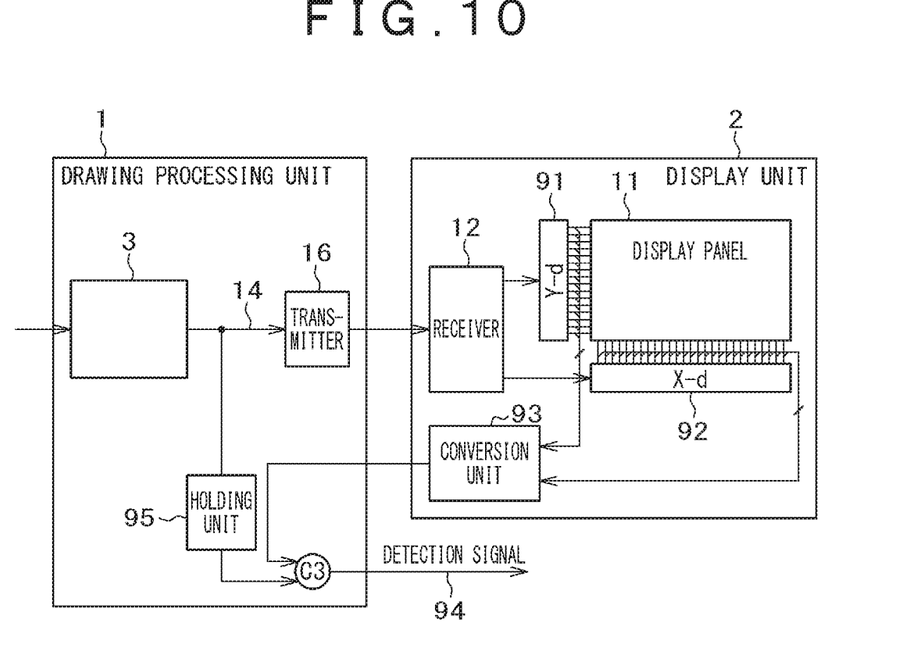
FIG. 10 is a block diagram of a display device according to a seventh embodiment.

The following describes a seventh embodiment with reference to FIG. 10.

FIG. 10 is a block diagram of a display device according to the seventh embodiment.

This embodiment observes a drive signal of a display panel, and then compares the drive signal with the drawing data to detect the breakdown.

A drawing processing unit 1 of this embodiment includes a drawing data generating unit 3, a transmitter 16, a comparator 38, and a data holding unit 95.

An output from the drawing data generating unit 3 is transmitted to the display unit 2 via the transmitter 16, and simultaneously output to the data holding unit 95. The data holding unit 95 is a buffer that temporarily holds data.

The display unit 2 includes a display panel 11, a receiver 12, an X-axis driver 92 and a Y-axis driver 91, and a data conversion unit 93. The X-axis driver 92 and the Y-axis driver 91 are drivers that control dots of a horizontal axis and a vertical axis of the display panel 11 respectively. In this embodiment, signals output from these X-axis driver 92 and Y-axis driver 91 to the display panel 11 are extracted to be output to the data conversion unit 93. The data conversion unit 93 restores and converts it into the data for drawing (for example, bit-map data) from these signals.

In contrast, the data holding unit 95 in the drawing processing unit 1 holds the data until when the stored data is output from the X-axis and Y-axis drivers, then restored at the data conversion unit 93, are then returned. Then, the comparator 38 compares the data for drawing that the data conversion unit 93 outputs and the data stored in the holding unit 95 to perform coincidence detection.

As described above, this embodiment ensures detection of the failure up to a driver output of the display unit 2.

Eighth Embodiment

Figure 11:
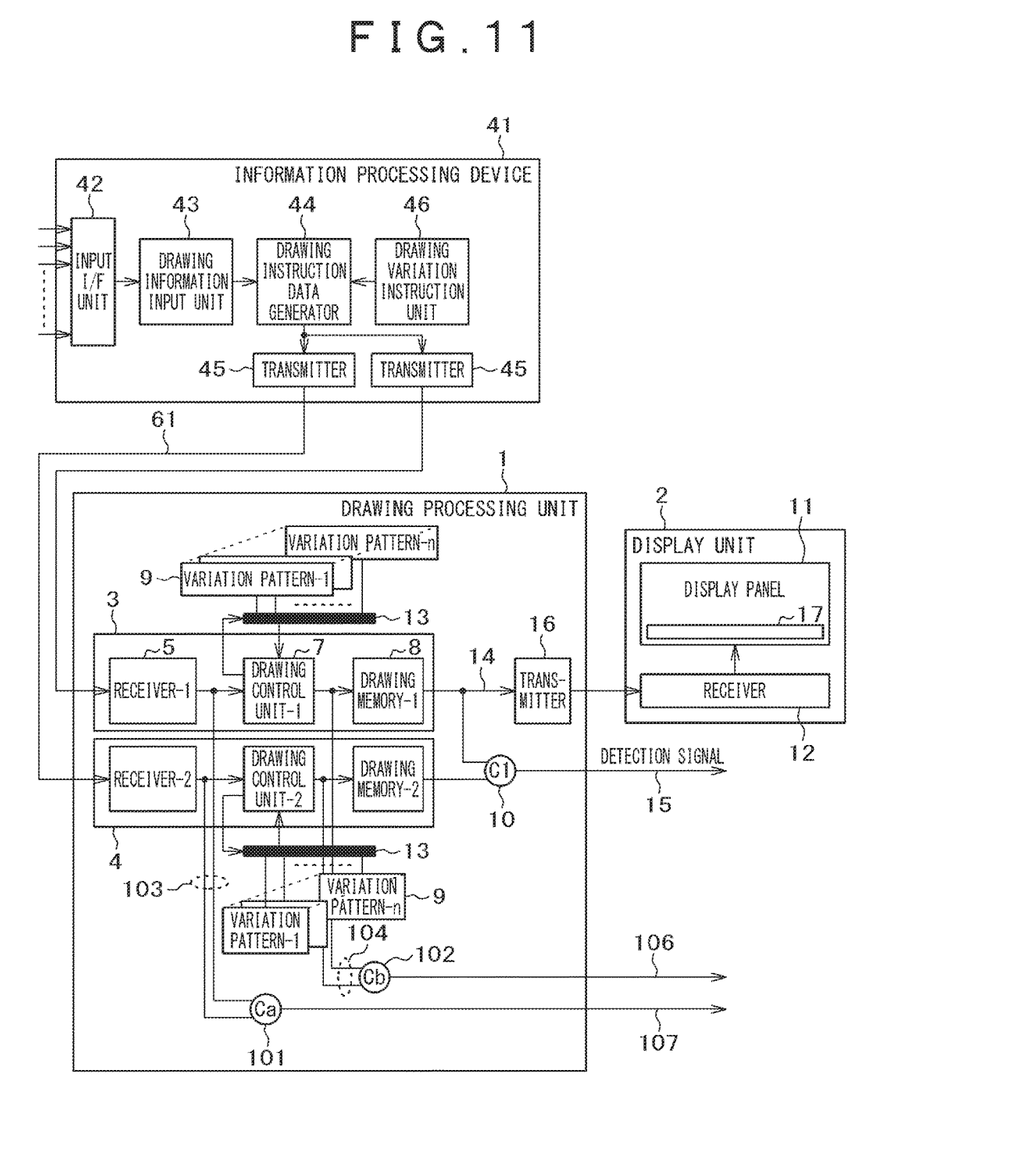
FIG. 11 is a block diagram of a display device according to an eighth embodiment.

The following describes an eighth embodiment with reference to FIG. 11.

FIG. 11 is a block diagram of a display device according to the eighth embodiment.

In this embodiment, parts different from those in the fourth embodiment will be mainly described.

This embodiment compares outputs of respective configurations of a drawing control unit to ensure recognition of a breakdown portion.

This embodiment has a configuration where a transmitter 45 of the information processing device 41 in the configuration of the display device of the fourth embodiment is redundantly configured, and the transmitters 45 transmit to each of the redundant-configured drawing processing units 1. Furthermore, in the drawing processing unit 1, comparators 101, 102, and 10 perform coincidence detection of outputs of the respective components of the receiver 5, the drawing control unit 7, and the drawing memory 8 respectively. This ensures detection at which the failure has occurred from the information processing device 41 to the drawing processing unit 1 to exchange only a failure part by the observer, thus decreasing a stop period and a maintenance period of the system.

For example, when inconsistency is detected in the comparator 101, it is suspected that the breakdown has occurred in any of the transmitter 45, a coupling line 61, and the receiver 5.

This embodiment only outputs coincidence detection signals 15, 106, and 107, however these detection signals also can be transmitted to another information processing device to be used for operation control. A part of or all the detection signals also can be input to the warning display illustrated in FIG. 9.

Ninth Embodiment

Figure 12:
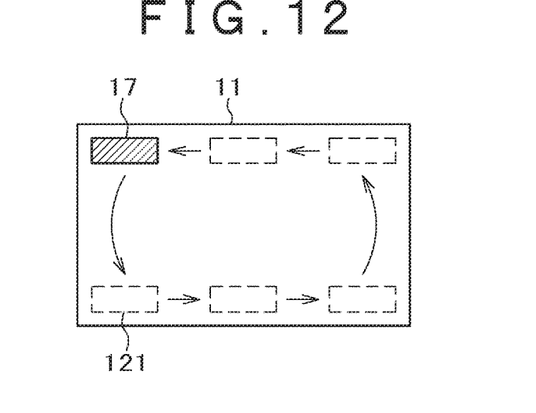
FIG. 12 is a diagram that illustrates a state that varies a drawing area.

The following describes a ninth embodiment with reference to FIG. 12.

FIG. 12 is a diagram that illustrates a state that varies a drawing area.

This embodiment controls a drawing position to move the display area 17 of the variation pattern in the above-described first embodiment to eighth embodiment. In the example illustrated in FIG. 12, the drawing position moves from the area 17 to an area 121, and then sequentially moves to areas illustrated in dashed lines and arrows. This facilitates the observer's visual perception of the freeze state to ensure a prompt detection of abnormalities.

Tenth Embodiment

Figure 13:
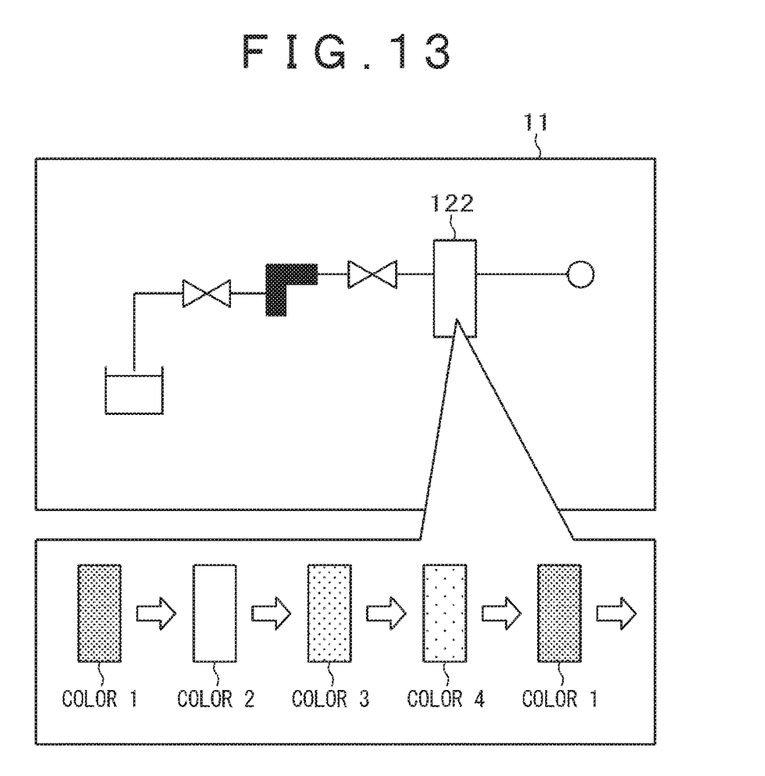
FIG. 13 is a diagram that illustrates a display example that changes colors of display elements such as display drawings and characters.

The following describes a tenth embodiment with reference to FIG. 13.

FIG. 13 is a diagram that illustrates a display example that changes colors of display elements such as display drawings and characters.

This embodiment applies the display of the variation pattern in the above-described first embodiment to eighth embodiment to a part of display elements used in an ordinary operation. In the example illustrated in FIG. 13, the color of a display element 122 sequentially changes from Color 1 to Color 2, Color 3, and then Color 4. This facilitates the observer's visual perception of the freeze state to ensure a prompt detection of abnormalities, and eliminates the need of a special disposition of the area that constantly varies to ensure the all display area to be used for display of the ordinary operation.

Advantageous Effects of Invention by Above-Described Embodiments

As understood by the above-described embodiments, the present invention can provide a display device that improves safety and reliability, when severe safety criteria are required such as in a case of monitor-display in industrial plant equipment.

What is claimed is:

1. A display device that receives data from an external device to display, the display device comprising:
    a plurality of drawing data generators;
    a plurality of variation patterns that vary at regular intervals to indicate an absence of a freeze state of the plurality of drawing data generators by said varying of said variation patterns;
    a display that displays drawing data; and
    a first comparator that compares whether input signals are coincident, wherein
    each said drawing data generator comprises
        a receiver that receives data from the external device;
        a drawing controller that converts the data received from the external device into drawing data; and
        a drawing memory that stores the drawing data, wherein
        the plurality of variation patterns is input to the plurality of drawing data generators,
    one output signal of one of said plurality of drawing data generators regarding drawing data including one of said plurality of variation patterns is transmitted to the display,
    an output signal from each of said plurality of drawing data generators is input to the first comparator, and
    the first comparator outputs a comparison result as a detection signal,
    wherein said plurality of variation patterns are displayed constantly during said absence of said freeze state and during said freeze state.

2. The display device according to claim 1, further comprising:
    a selector that switches one of the input signals;
    a time-division switch that time-divisionally instructs a selection of the selector;

an expected value signal generator that generates a signal in a constant pattern; and a second comparator that compares whether the input signals are coincident, wherein the plurality of variations patterns comprise variation patterns that are opposing patterns with respect to one another, each said output signal of each said drawing data generator regarding the drawing data including the variation pattern is transmitted to the selector, the selector time-divisionally selects the input signal to transmit to the display, an output signal of the first comparator and an output signal of the expected value signal generator are input to the second comparator, and the second comparator outputs a comparison result as a detection signal.

3. The display device according to claim 1, wherein the drawing controller and the drawing memory are components of a processor.

4. The display device according to claim 3, further comprising a synchronizer that buffers input data to synchronize output, wherein the plurality of outputs of the plurality of drawing data generators is input to the synchronizer.

5. The display device according to claim 1, further comprising a warning display device, wherein when the detection signals output from the first comparator are not coincident, the display device causes the warning display device to operate.

6. The display device according to claim 1, further comprising:

a third comparator that receives a plurality of output signals from a plurality of the drawing controllers of the plurality of drawing data generators to compare; and a fourth comparator that receives a plurality of output signals of the receivers of the plurality of drawing data generators to compare, wherein the third comparator outputs a comparison result as a detection signal, and the fourth comparator outputs a comparison result as a detection signal.

7. The display device according to claim 1, wherein the display device changes a display position of a display area of the variation pattern of the display.

8. The display device according to claim 1, wherein the variation pattern is a pattern that changes an attribution of a display element displayed on the display.

9. A display device that receives data from an external device to display, the display device comprising:

a drawing data instruction generator that generates a drawing instruction order;

a receiver that receives data from the external device;

a variation pattern that varies at regular intervals to be displayed to indicate an absence of a freeze state of the plurality of drawing data instruction generator by said varying of said variation pattern;

a drawing variation instruction generator that generates a variation pattern selection instruction order that displays the variation pattern to transmit to the drawing data instruction generator;

a drawing controller that generates drawing data based on the drawing instruction order transmitted from the drawing data instruction generator;

a drawing memory that stores the drawing data; and a display that displays the drawing data, wherein the drawing data instruction generator receives the variation pattern selection instruction order from the drawing variation instruction generator, and generates a drawing instruction order row including the variation pattern selection instruction order to transmit to the drawing controller, and the drawing controller generates drawing data including the variation pattern to output to the display, and wherein said variation pattern is displayed constantly during said absence of said freeze state and during said freeze state.

10. The display device according to claim 9, wherein the display device changes a display position of a display area of the variation pattern of the display.

11. The display device according to claim 9, wherein the variation pattern is a pattern that changes an attribution of a display element displayed on the display.

12. A display device that receives data from an external device to display, the display device comprising:

a drawing data generator;

a display that displays drawing data; and a comparator that compares whether input signals are coincident, wherein the drawing data generator comprises a receiver that receives data from the external device;

a drawing controller that converts the data received from the external device into drawing data;

a drawing memory that stores the drawing data; and a data holding device that temporarily holds input data, wherein the display includes:

a display panel; and a data converter that receives a drive signal that drives the display panel to convert into drawing data, one output signal of the drawing data generator regarding the drawing data is transmitted to the display, and another output signal is transmitted to the data holding device, an output of the data holding device and an output of the data converter are input to the comparator, the comparator outputs a comparison result as a detection signal to indicate a freeze state of the drawing data generator, and the drawing generator also outputs a variation pattern that varies at regular intervals to indicate an absence of a freeze state of the drawing data generator by said varying of said variation pattern, wherein said variation pattern is displayed constantly during said absence of said freeze state and during said freeze state.

* * * * *